United States Patent
Alletto et al.

(10) Patent No.: US 11,687,773 B2
(45) Date of Patent: Jun. 27, 2023

(54) LEARNING METHOD AND RECORDING MEDIUM

(71) Applicant: Panasonic Intellectual Property Corporation of America, Torrance, CA (US)

(72) Inventors: Stefano Alletto, Sunnyvale, CA (US); Luca Rigazio, Campbell, CA (US); Sotaro Tsukizawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 944 days.

(21) Appl. No.: 16/509,451

(22) Filed: Jul. 11, 2019

(65) Prior Publication Data
US 2019/0332939 A1   Oct. 31, 2019

Related U.S. Application Data

(63) Continuation of application No. PCT/JP2018/008230, filed on Mar. 5, 2018.

(60) Provisional application No. 62/472,151, filed on Mar. 16, 2017.

(51) Int. Cl.
| | |
|---|---|
| G06N 3/08 | (2023.01) |
| H04N 19/18 | (2014.01) |
| H04N 19/31 | (2014.01) |
| H04N 19/513 | (2014.01) |
| G06N 3/045 | (2023.01) |

(52) U.S. Cl.
CPC .............. G06N 3/08 (2013.01); G06N 3/045 (2023.01); H04N 19/18 (2014.11); H04N 19/31 (2014.11); H04N 19/513 (2014.11)

(58) Field of Classification Search
None
See application file for complete search history.

(56) References Cited

U.S. PATENT DOCUMENTS

2017/0109584 A1*   4/2017   Yao .................... H04N 21/4666

OTHER PUBLICATIONS

Dosovitskiy et al., "Flownet: Learning optical flow with convolutional networks," In IEEE International Conference on Computer Vision (ICCV), 2015.*

(Continued)

Primary Examiner — Michael J Hess
(74) Attorney, Agent, or Firm — Greenblum & Bernstein, P.L.C.

(57) ABSTRACT

A learning method includes an input process to input, to a neural network, a first image and a second image that constitute a moving image and that are temporally adjacent to each other, where the second image is an image subsequent to the first image with a predetermined time interval therebetween, a learning process to cause the neural network to use the first image and the second image and learn to output a transformation matrix applied to all pixels of the first image and used to convert the first image into the second image, and an output process to output, as a result of estimation of motion between the first image and the second image, a motion amount image generated from the transformation matrix and representing an amount of motion of each of the pixels of the first image that continues until the predetermined time interval elapses.

5 Claims, 11 Drawing Sheets

(56) References Cited

OTHER PUBLICATIONS

Brox et al., "FlowNet2.0: Evolution of Optical Flow Estimation with Deep Networks," Dec. 2016.*
The Extended European Search Report dated Dec. 10, 2019 for the related European Application No. 18768055.8.
Stefano Alletto et al: "Trans Fl ow: Unsupervised Motion Flow by Joint Geometric and Pixel-level Estimation", arxiv.org, Cornell University Library, 201 Olin Library Cornell University Ithaca, NY14853, Jun. 8, 2017 (Jun. 2017), XP080766853, pp. 1-10.
Zhe Ren et al: "Unsupervised Deep Learning for Optical Flow Estimation", Proceedings of the Thirty-First AAAI Conference on Artificial Intelligence, Feb. 4, 2017 (Feb. 4, 2017), pp. 1495-1501, XP055634669.
Yu Jason J et al: "Back to Basics:Unsupervised Learning of Optical Flow via Brightness Constancy and Motion Smoothness", Nov. 24, 2016 (Nov. 24, 2016), Intelligent Virtual Agent. IVA 2015. LNCS; [Lecture Notes in Computer Science; Lect.Notes Computer], Springer, Berlin, Heidelberg, pp. 3-10, XP047363127.
Daniel Detone et al: "Deep Image Homography Estimation", arxiv.org, Cornell University Ithaca, NY 14853, Jun. 13, 2016 (Jun. 13, 2016), XP080707525, Sections IV and V, 6 pages.
Communication pursuant to Article 94(3) EPC dated Aug. 12, 2020 for the related European Patent Application No. 18768055.8.
Anurag Ranjan et al: "Optical Flow Estimation using a Spatial Pyramid Network", arxiv.org, Nov. 3, 2016, XP080728899, pp. 1-10.
International Search Report of PCT application No. PCT/JP2018/008230 dated May 29, 2018.
Gucan Long et al., "Learning Image Matching by Simply Watching Video", In European Conference on Computer Vision, Mar. 19, 2016, pp. 434-450.
Max Jaderberg et al., "Spatial Transformer Networks", In Advances in Neural Information Processing Systems, Jun. 5, 2015.

* cited by examiner

| METHOD | Acc@5 | APE | TIME(s) |
|---|---|---|---|
| H-net | 0.717 | 4.39 | 0.012 |
| F-net | 0.471 | 7.72 | 0.046 |
| Joint | 0.866 | 3.13 | 0.051 |

| METHOD | Acc@5 | APE | TIME(s) |
|---|---|---|---|
| DeepFlow | 0.725 | 8.091 | 16.5 |
| FlowNet2 | 0.709 | 9.108 | 0.12 |
| EpicFlow | 0.810 | 7.448 | 15.3 |
| MRFlow | 0.833 | 9.284 | 170 |
| Ours | 0.745 | 7.627 | 0.05 |
| Ours+FT | 0.777 | 6.770 | 0.05 |

FIG. 14

| METHOD | Avg. | NIGHT | RAIN | DAY |
|---|---|---|---|---|
| DeepFlow | 20.49 | 23.99 | 18.45 | 19.02 |
| FlowNet2 | 20.70 | 22.65 | 19.44 | 20.02 |
| EpicFlow | 20.90 | 24.58 | 18.67 | 19.44 |
| Ours | 30.69 | 34.82 | 27.91 | 29.33 |

LEARNING METHOD AND RECORDING MEDIUM

BACKGROUND

1. Technical Field

The present disclosure relates to a learning method and a recording medium and, in particular, to a learning method and a recording medium performed by a computer using a neural network.

2. Description of the Related Art

In recent years, a technique for estimating the optical flow that represents the motion between images has been developed. If the optical flow can be accurately estimated in real time, a plurality of object on a road can be detected or tracked from the images obtained by a camera or the like mounted on a moving automobile. For this reason, the technique is expected to achieve Advanced Driver Assistance System (ADAS), which is a system to detect and avoid the possibility of an accident in advance, and a self-driving car.

For example, a technique of causing a neural network to learn by using, as teacher data, correct answer data provided in the form of a known data set, such as Kitti Dataset, and estimate the optical flow is described in G. Long, L. Kneip, J M Alvarez, H. Li, X. Zhang, and Q. Yu, Learning image matching by simply watching video. In European Conference on Computer Vision, pages 434-450. Springer, 2016. 1, 3 (hereinafter referred to as non-patent literature (NPL) 1).

SUMMARY

In one general aspect, the techniques disclosed here feature a learning method including inputting, to a neural network, a first image and a second image that constitute a moving image and that are temporally adjacent to each other, where the second image is an image subsequent to the first image with a predetermined time interval therebetween, causing the neural network to use the first image and the second image and learn to output a transformation matrix applied to all pixels of the first image and used to convert the first image into the second image, and outputting, as a result of estimation of motion between the first image and the second image, a motion amount image generated from the transformation matrix and representing an amount of motion of each of the pixels of the first image that continues until the predetermined time interval elapses.

According to the learning method or the like of the present disclosure, a neural network can be trained to learn estimation of the optical flow without the teacher data.

It should be noted that general or specific embodiments may be implemented as a system, a method, an integrated circuit, a computer program, a computer-readable storage medium, such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 14 is a diagram illustrating the evaluation of the influence of environmental conditions on the learning method using DR (eye) VE Data base, according to the present disclosure.

DETAILED DESCRIPTION

Figure 1:
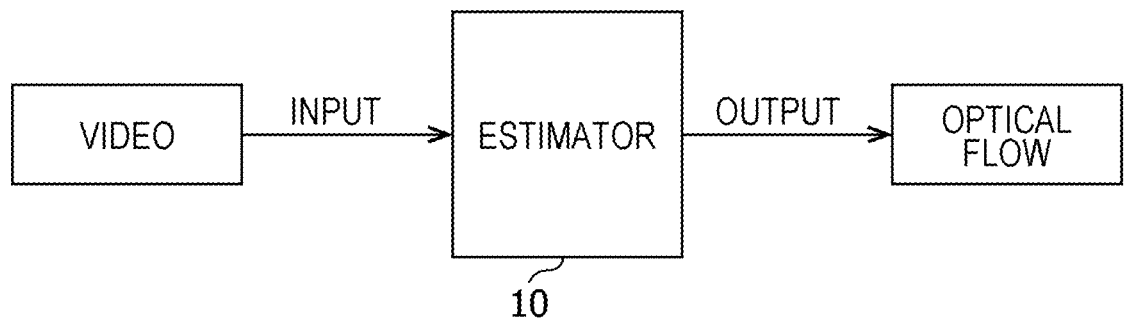
FIG. 1 is a block diagram illustrating an example of the configuration of an estimator according to an embodiment.

Underlying Knowledge Forming Basis of the Present Disclosure

In general, it is known that to accurately estimate the motion flow from images acquired by a moving car, complicated processing that requires dedicated hardware is needed. In addition, in recent years, algorithms aiming at estimation of the motion flow have been actively developed. However, lack of publicly available data sets that can be used to estimate a motion flow causes a serious problem.

For example, Kitti Flow Data set, which is a publicly available data set, has been acquired by using LIDAR point clouds to execute 2D-3D matching, make accurate matching, and generate correct answer data. However, the correct answer data provided by the Kitti Flow Data set is less than 400 frames with correct answer information, and the quantity is not sufficient. In addition, the correct answer data are not provided for use in estimating the optical flow. Accordingly, the correct answer data do not have sufficient accuracy for learning estimation of an optical flow.

In contrast, according to a method for learning the estimation of the optical flow without teacher data, a sufficient number of data sets are available. However, the problem is that how estimation of the optical flow is learned without correct answer information serving as the teacher data. Even when as is the case with the technique described in NPL 1, learning is carried out by using teacher data, it is difficult to accurately estimate the optical flow in real time. Consequently, the method turns out to be still problematic.

In summary, the technique disclosed in NPL 1 has a problem in that it is difficult to accurately estimate the optical flow in real time. This is because the correct answer data provided by the known data set is inadequate in quantity and is not provided for use in estimating the optical flow. In contrast, if the neural network can be trained without the teacher data, a sufficient number of data sets used for training are available. However, it is difficult to learn the intended output, that is, estimation of the optical flow.

The present disclosure has been made in view of the above circumstances and provides a learning method and a program capable of training a neural network to learn estimation of an optical flow without teacher data.

According to an embodiment of the present disclosure, a learning method includes an input step of inputting, to a neural network, a first image and a second image that constitute a moving image and that are temporally adjacent to each other, where the second image is an image subsequent to the first image with a predetermined time interval therebetween, a learning step of causing the neural network to use the first image and the second image and learn to output a transformation matrix applied to all pixels of the first image and used to convert the first image into the second image, and an output step of outputting, as a result of estimation of motion between the first image and the second image, a motion amount image generated from the transformation matrix and representing an amount of motion of each of the pixels of the first image that continues until the predetermined time interval elapses.

As a result, the neural network can be trained to learn the estimation of an optical flow without the teacher data.

In addition, according to an embodiment of the present disclosure, a learning method includes an input step of inputting, to a neural network, a first image and a second image that constitute a moving image and that are temporally adjacent to each other, where the second image is an image subsequent to the first image with a predetermined time interval therebetween, a learning step of i) causing a first neural network that constitutes the neural network to use the first image and the second image and learn to output a first motion amount image representing a first amount of motion of each of pixels of the first image that continues until the predetermined time interval elapses and ii) causing a second neural network that constitutes the neural network and that differs from the first neural network to use the first image, the second image, and the first motion amount image and learn to output a second motion amount image representing a second amount of motion of each of the pixels of the first image that continues until the predetermined time interval elapses, and an output step of outputting the second motion amount image as a result of estimation of motion between the first image and the second image.

As a result, the neural network can be trained to learn the estimation of an optical flow without the teacher data.

Herein, for example, the learning step may involve causing the first neural network to use the first image and the second image and learn to output a transformation matrix applied to all the pixels of the first image and used to convert the first image into the second image and causing the first neural network to learn to output the first motion amount image generated from the transformation matrix.

In addition, for example, the learning step may involve a determination step of calculating a combined error obtained by combining a first error representing an error between a first estimated image that is generated from the transformation matrix and the first image and that is an image subsequent to the first image with the predetermined time interval therebetween and the second image with a second error representing an error between a second estimated image that is generated from the second motion amount image and the first image and that is an image subsequent to the first image with the predetermined time interval therebetween and the second image and, thereafter, determining weights of the first neural network and the second neural network with a minimum combined error as the weights of the first neural network and second neural network that have carried out learning when the combined error is minimized.

Furthermore, for example, the first neural network that constitutes the neural network may include at least one convolutional layer and at least one fully connected layer, and the fully connected layer may be configured to output at least eight of nine parameters functioning as nine coefficients that constitute the transformation matrix.

Still furthermore, for example, the first neural network that constitutes the neural network may include at least two convolutional layers, and the final layer of the at least two convolutional layers may be configured to output at least eight of nine parameters functioning as nine coefficients that constitute the transformation matrix.

Yet still furthermore, for example, the second neural network that constitutes the neural network may include a compression layer consisting of at least one convolutional layer, an expansion layer located subsequent to the compression layer and consisting of at least one deconvolutional layer, and a single convolutional layer located subsequent to the expansion layer. The single convolutional layer may be configured to output two parameters indicating the amount of motion of each of the pixels constituting the second motion amount image.

It should be noted that general or specific embodiments may be implemented as a system, a method, an integrated circuit, a computer program, a computer-readable storage medium, such as a CD-ROM, or any selective combination of the system, the method, the integrated circuit, the computer program, and the storage medium.

Note that each of the embodiments below describes a general or specific example. A value, a shape, a constituent element, steps, and the sequence of steps used in the embodiments described below are only examples and shall not be construed as limiting the scope of the present disclosure. In addition, among the constituent elements in the embodiments described below, the constituent element that does not appear in an independent claim, which has the broadest scope, is described as an optional constituent element. In addition, all the embodiments may be combined in any way.

Embodiments

An information processing method and the like for use of an estimator 10 according to an embodiment is described with reference to the accompanying drawings.

Configuration of Estimator

Figure 2:
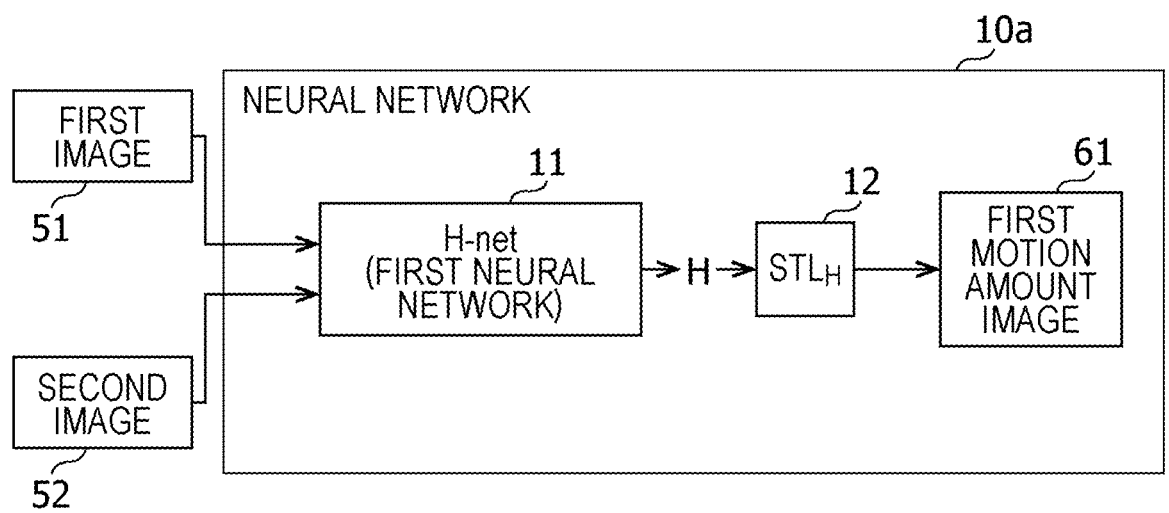
FIG. 2 is a block diagram illustrating an example of the configuration of a neural network used by the estimator illustrated in FIG. 1.

FIG. 1 is a block diagram illustrating an example of the configuration of the estimator 10 according to the embodiment. FIG. 2 is a block diagram illustrating an example of the configuration of a neural network used by the estimator 10 illustrated in FIG. 1.

The estimator 10 is implemented by a computer or the like that uses a neural network. When video, which is a moving image constituted by temporally consecutive images, is input, the estimator 10 outputs an optical flow which is the result of estimation of a motion between images. Note that the estimator 10 may output, as an optical flow, an image representing the motion between images or may output, as an optical flow, estimated information regarding the motion between the images. In addition, the video is typically a temporally continuous moving image obtained by capturing the images in the direction in which the automobile travels by an imaging unit, such as a camera mounted in the automobile. However, the video is not limited thereto. The video may be temporally consecutive still images.

An example of the configuration of a neural network used by the estimator 10 is described below.

Configuration of Neural Network

FIG. 2 is a block diagram illustrating an example of the configuration of a neural network 10a used by the estimator 10 illustrated in FIG. 1.

As illustrated in FIG. 2, the neural network 10a includes an H-net 11 and an $STL_H$ 12. Hereinafter, the neural network 10a may be also referred to as an "Ego-motion network". The neural network 10a receives a first image 51 and a second image 52 input thereto. The first image 51 and the second image 52 are temporally adjacent images that constitute a moving image, and the second image 52 is an image subsequent to the first image 51 with a predetermined time interval therebetween. The neural network 10a outputs the result of estimation of the motion between the first image 51 and the second image 52.

H-Net

The H-net 11 is an example of a first neural network. The H-net 11 outputs a transformation matrix H used for all the pixels of the first image 51. The transformation matrix H converts the first image 51 into the second image 52. More specifically, the H-net 11 consists of at least one convolutional layer and at least one fully connected layer. The H-net 11 outputs nine parameters which are nine (3×3) coefficients that constitute the transformation matrix H. That is, the fully connected layer is configured to output nine parameters, which are nine coefficients that constitute the transformation matrix H. Note that the fully connected layer may be configured to output at least eight of the nine parameters which are the nine coefficients that constitute the transformation matrix H. This is because the ninth parameter can be calculated by using the other eight parameters.

Note that the transformation matrix H is a matrix that can roughly estimate the motion field (a motion area, location) between two still images and that can perform projection transform processing on the first image 51 to obtain the second image 52, for example. The transformation matrix H can characterize the projection by nine (3×3) parameters. Thus, the dimension of the output space can be reduced. As a result, the H-net 11 can perform arithmetic processing at high speed.

Figure 3:
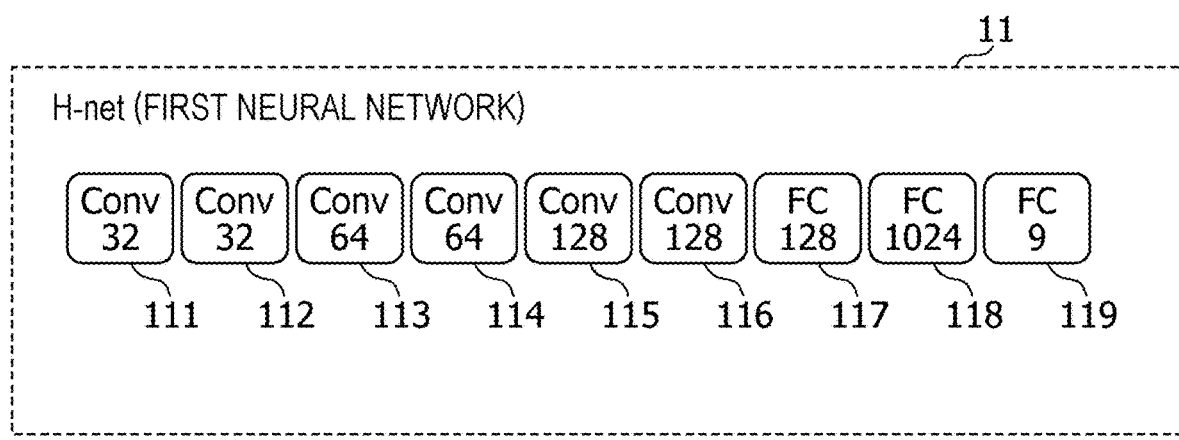
FIG. 3 is a diagram illustrating an example of the configuration of an H-net according to the embodiment.

FIG. 3 is a diagram illustrating an example of the configuration of the H-net 11 according to the present embodiment.

As illustrated in FIG. 3, for example, the H-net 11 is a compact neural network consisting of six convolutional layers (Cony 111 to Cony 116) and three fully connected layers (FC 117 to FC 119). The number of outputs of each of Cony 111 and Cony 112 is 32, the number of outputs of each of Cony 113 and Cony 114 is 64, and the number of outputs of each of Cony 115 and Cony 116 is 128. The six convolutional layers (Cony 111 to Cony 116) are characterized by a 3×3 kernel, and the stride which is an interval of application of convolution is 2. The six convolutional layers (Cony 111 to Cony 116) use ReLU (Rectified Linear Unit) as an activation function.

In addition, the number of outputs of the FC 117 is 128, the number of outputs of the FC 118 is 1024, and the number of outputs of the FC 119 which is the final one of the fully connected layers is 9.

Note that it has been described that the H-net 11 can be composed of at least one convolutional layer and at least one fully connected layer, and the H-net 11 is configured such that the number of outputs of the final one of the at least one fully connected layer is nine, as illustrated in the FC 119.

In addition, since the result of output of the fully connected layer can be provided by even the convolutional layer, the H-net 11 does not have to constitute the fully connected layer. That is, the H-net 11 may be constituted by two or more convolutional layers, and the number of outputs of the final one of the two or more convolutional layers can be set to nine, as in the FC 119. Since, as described above, the ninth parameter can be calculated from the other eight parameters, the final one of the two or more convolutional layers may be configured to output at least eight of the nine parameters that serve as the nine coefficients that constitute the transformation matrix H.

$STL_H$

By using the transformation matrix H output from the H-net 11, the $STL_H$ 12 outputs, as the result of estimation of the motion between the first image 51 and the second images 52, a first motion amount image 61 representing the first amount of motion of each of pixels of the first image 51 that continues until a predetermined time interval elapses. The $STL_H$ 12 is, for example, a Spatial Transformer Layer constituted by a Spatial Transformer Network (STN) described in M. Jaderberg, K. Simonyan, A. Zisserman, et al. Spatial transformer networks. In Advances in Neural Information Processing Systems, pages 2017-2025, 2015. 2 (hereinafter referred to as NPL2). The STN is completely differentiable so as to be capable of maintaining the spatial invariance. NPL 2 describes a technique to train the STN to learn parameters used to output a transformation matrix for warping (transforming, such as deforming) the image of an object captured at a given angle into the image of the same object captured at a different angle. At this time, if a projection transformation $T\varphi$ estimated from two frames $U_t$ and $U_{t+1}$ is given by a widely used parametric function, such as a neural network, the STN can obtain $U_{t+1}$ by calculating $T\varphi(U_t)$.

Note that the $STL_H$ 12 can generate an estimated image that is an image close to the second image 52 by transforming the first image 51 by using the transformation matrix H output from the H-net 11. The transformation matrix H estimated by the H-net 11 is a projection matrix for distorting and converting the first image 51 into the second image 52. Consequently, the transformation matrix H carries out global transformation which can track the overall motion between images but cannot track the detailed motions of individual objects in the images. Accordingly, the estimated image obtained by transforming the first image 51 using the transformation matrix H output from the H-net 11 does not make the second image 52 but is a close image. Similarly, the first motion amount image 61 generated using the transformation matrix H output from the H-net 11 represents the result of estimation of the overall motion between the first image 51 and the second image 52. However, the first motion amount image 61 does not represent estimation of the detailed motions of individual objects in the images.

As described above, the neural network 10a outputs, as the result of estimation of the motion between the first image 51 and the second image 52, the first motion amount image 61 which is generated by using the transformation matrix H output from the H-net 11 and which represents a first amount of motion of each of the pixels of the first image that continues until a predetermined time interval elapses. Since the first motion amount image 61 represents the first amount of motion of each of the pixels of the first image 51 until the predetermined time interval elapses, the first motion amount image 61 can be considered to be an optical flow representing the motion between the first image 51 and the second image 52. That is, the neural network 10a can output the estimated optical flow.

The configuration of a neural network for use in the estimator 10 is not limited to the configuration of the neural network 10a illustrated in FIG. 2. The configuration of a neural network 10b illustrated in FIG. 4 may be adopted. The configuration of the neural network 10b is described below.

Configuration of Neural Network

Figure 4:
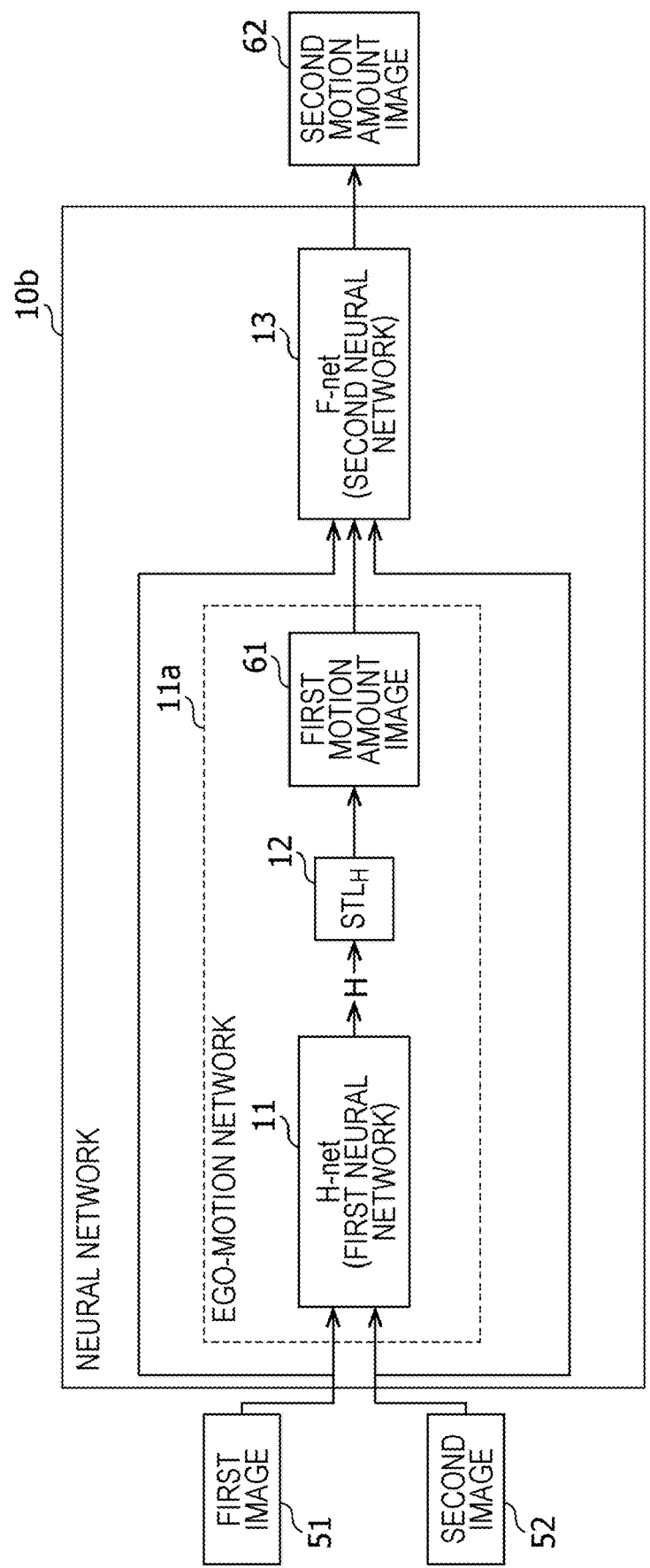
FIG. 4 is a block diagram illustrating an example of the configuration of a neural network used by the estimator illustrated in FIG. 1.

FIG. 4 is a block diagram illustrating an example of the configuration of the neural network 10b for use in the estimator 10 illustrated in FIG. 1. The same reference numerals are used in FIG. 4 to describe those constituent elements that are identical to the constituent elements of FIG. 2, and detailed description of the constituent elements is not repeated.

As illustrated in FIG. 4, the neural network 10b includes an H-net 11, an $STL_H$ 12, and an F-net 13. Like the neural network 10a, the neural network 10b receives a first image 51 and a second image 52 input thereto. The first image 51 and the second image 52 are temporally adjacent images that constitute a moving image, and the second image 52 is an image subsequent to the first image 51 with a predetermined time interval therebetween. The neural network 10b outputs the result of estimation of the motion between the first image 51 and the second image 52. Note that in FIG. 4, a neural network having the H-net 11, $STL_H$ 12 and F-net 13 is referred to as an "Ego-motion network 11a".

F-Net

The F-net 13 is an example of a second neural network that constitutes the neural network 10b and that differs from the first neural network. The F-net 13 is also referred to as a "refinement network". The F-net 13 receives the first image 51, the second image 52, and a first motion amount image 61 representing a first amount of motion. The F-net 13 outputs a second motion amount image 62 representing a second amount of motion of each of the pixels of the first image 51 that continues until the predetermined time interval elapses. More specifically, the F-net 13 includes a compression layer consisting of at least one convolutional layer, an expansion layer located subsequent to the compression layer and consisting of at least one deconvolutional layer, and a single convolutional layer located subsequent to the expansion layer. The F-net 13 outputs two parameters indicating the amount of motion of each of the pixels that constitute the second motion amount image 62 representing the second amount of motion. That is, the single convolutional layer located subsequent to the expansion layer is configured to output two parameters indicating the amounts of motion of the pixels that constitute the second amounts of motion.

Figure 5:
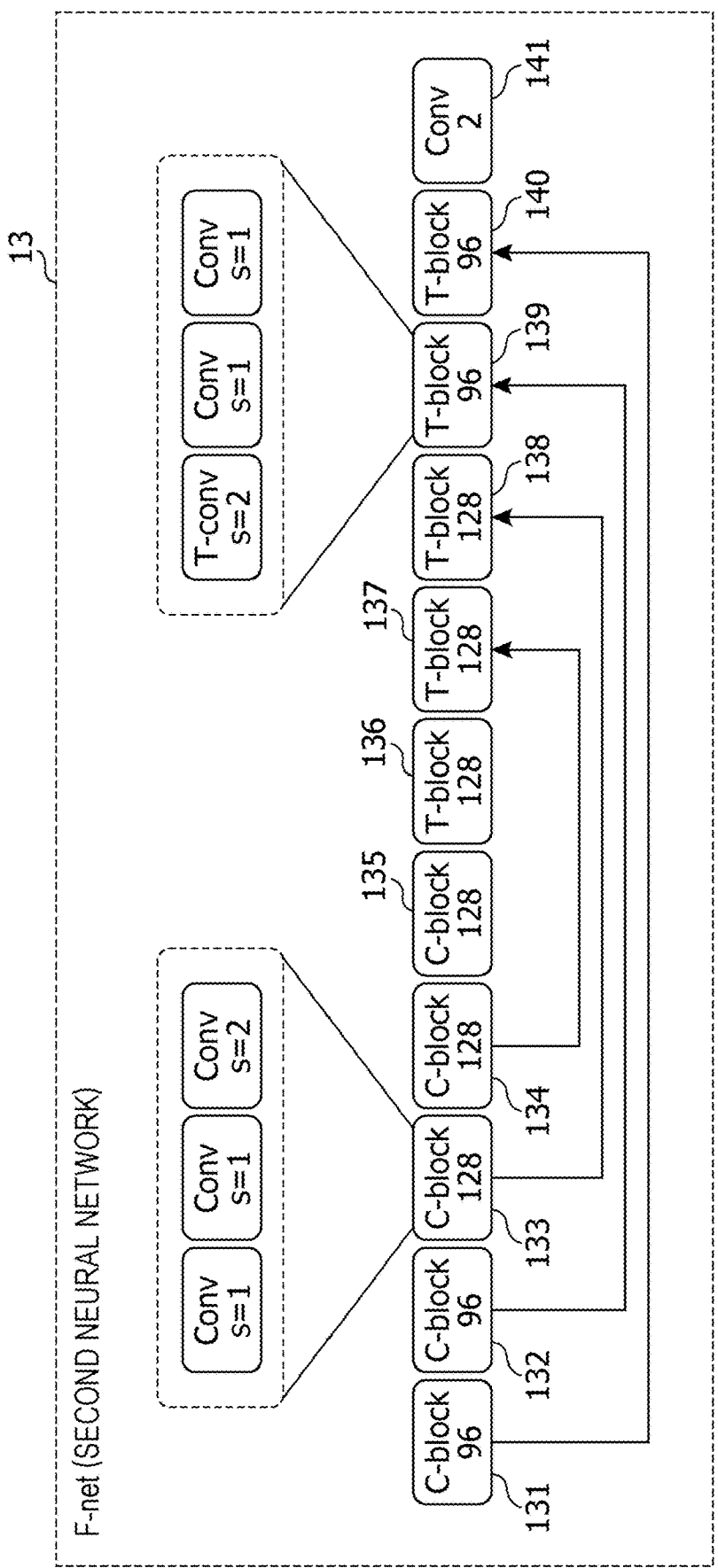
FIG. 5 is a diagram illustrating an example of the configuration of an F-net according to the embodiment.

FIG. 5 is a diagram illustrating an example of the configuration of the F-net 13 according to the embodiment.

For example, as illustrated in FIG. 5, the F-net 13 is composed of five compression layers (C-blocks 131 to 135), five expansion layers (T-blocks 136 to 140), and a final layer (Cony 141) which is a convolutional layer. Each of the arrows illustrated in FIG. 5 indicates a skip connection between the compression layer and the expansion layer. The five compression layers (C-blocks 131 to 135) and five expansion layers (T-blocks 136 to 140) form an auto encoder that reduces the dimensions. The five expansion layers (T-blocks 136 to 140) have the mirrored structures of the structures of five compression layers.

The number of outputs of each of C-block 131 and C-block 132 is 96, and the number of outputs of each of C-block 133 to C-block 135 is 128. Each of the five compression layers C-block 133 to C-block 135 is composed of three convolutional layers and is characterized by a 3×3 kernel. The stride of the final one of the three convolutional layers is 2, and the stride of the other convolutional layers are 1. That is, in each of the compression layers, the feature is extracted by sliding the kernel one pixel at a time in the two convolutional layers other than the final one of three convolutional layers and by sliding the kernel two pixels at a time in the final layer. In this way, in each of the compression layers, the feature of the input first motion amount image 61 is compressed and is transferred to the next layer.

The number of outputs of each of T-block 136 to T-block 138 is 128, and the number of outputs of each of T-block 139 and T-block 140 is 96. Each of the five expansion layers T-block 136 to T-block 140 is composed of three deconvolutional layers (also referred to as "transposed convolutional layers"). The expansion layer is characterized by a 4×4 kernel. The stride of the first one of the three convolutional layers is 2, and the stride of the other convolutional layers is 1. That is, by expanding the feature by sliding the kernel two pixels at a time in the first one of the three convolutional layers and expanding the feature by sliding the kernel one pixel at a time in the subsequent two convolutional layers, each of the five expansion layers expands the feature of the input compressed first motion amount image 61 and transfers the feature to the next.

In addition, the number of outputs of Cony 141, which is the final convolutional layer, is set to two. The reason why the number of outputs is set to two is because the amount of motion of each of the pixels that constitute the second motion amount image is expressed by two parameters, one in the X direction and the other in the Y direction of the image.

As described above, in the neural network 10b, the first motion amount image 61 generated using the transformation matrix H output from the H-net 11, the first image 51, and the second image are input to the F-net 13. Note that the first motion amount image 61 represents the first amount of motion of each of the pixels of the first image that continues until the predetermined time interval elapses. Thereafter, the second motion amount image 62 output from the F-net 13 is output as the result of estimation of the motion between the first image 51 and the second image 52. The second motion amount image 62 represents the second amount of motion of each of the pixels of the first image 51 that continues until the predetermined time interval elapses.

Since the second motion amount image 62 represents the second amount of motion of each of the pixels of the first image 51 that continues until the predetermined time interval elapses, the second motion amount image 62 is considered to be an optical flow that represents the motion between the first image 51 and the second image. That is, the neural network 10b can output the estimated optical flow.

Result of Estimation Process Performed by Estimator

Figure 6:
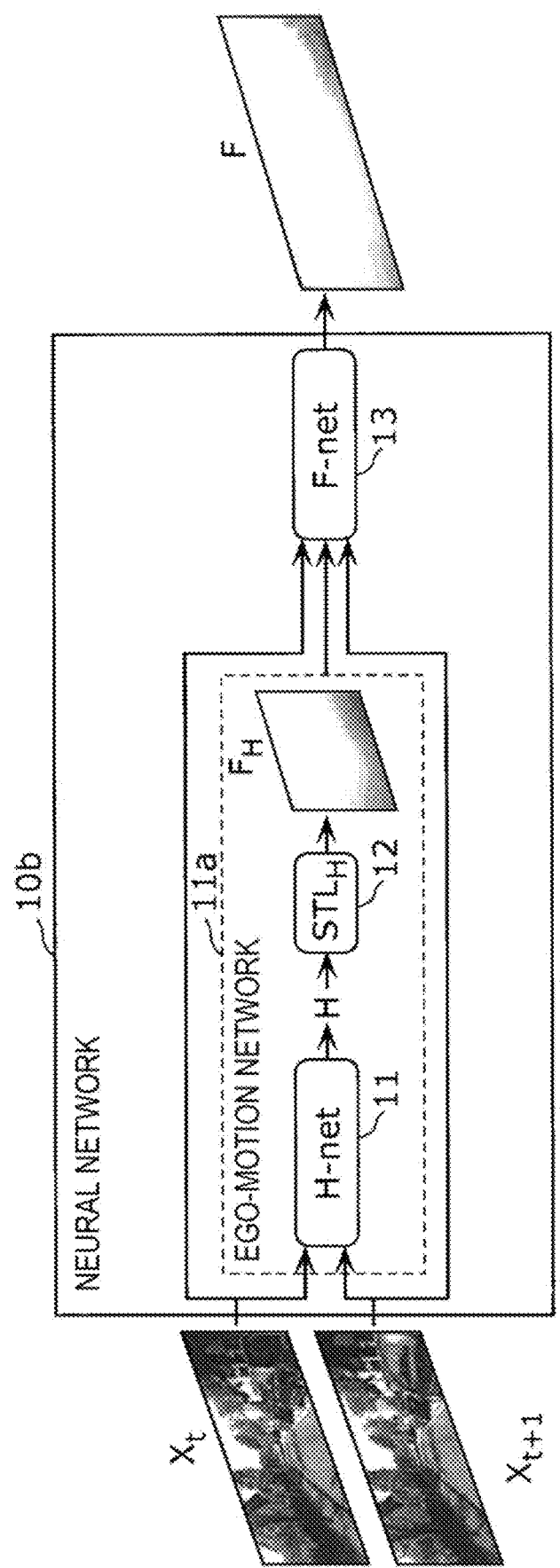
FIG. 6 is a schematic illustration of the result of an estimation process performed by the estimator according to the embodiment.

FIG. 6 is a schematic illustration of the result of an estimation process performed by the estimator 10 according to the embodiment. FIG. 6 illustrates an example of the result of estimation process performed by the estimator 10 using the neural network 10b illustrated in FIG. 4.

As illustrated in FIG. 6, suppose that frames $X_t$ and $X_{t+1}$, which are temporally consecutive images captured by an in-vehicle camera, are input as the first image 51 and the second image 52, respectively, to the neural network 10b used by the estimator 10. In this case, the Ego-motion Network 11a outputs, to the F-net 13, a motion amount image $F_H$ representing the amount of motion of each of the pixels of the frame $X_t$ that continues until the predetermined time interval elapses as the first motion amount image 61. Note that the motion amount image $F_H$ is an image representing the motion between the frames $X_t$ and $X_{t+1}$ by the darkness of color. The F-net 13 receives the motion amount image $F_H$ and the frames $X_t$ and $X_{t+1}$ output from the Ego-motion network 11a and outputs, as the result of estimation of the motion between the frames $X_t$ and $X_{t+1}$, a motion amount image F representing the amount of motion of each of the pixels of the frame $X_t$ that continues until the predetermined time interval elapses.

In the motion amount images $F_H$ and F of the example illustrated in FIG. 6, as the darkness of color on the left side from the center of the motion amount image increases, the motion between the frames $X_t$ and $X_{t+1}$ on the left side increases. Similarly, as the darkness of color on the right side from the center of the motion amount image $F_H$ and F increases, the motion between the frames $X_t$ and $X_{t+1}$ on the right side increases.

In addition, although from the motion amount image $F_H$, the overall motion between the frames $X_t$ and $X_{t+1}$ can be tracked, it is difficult to track the detailed motion of individual objects included in the frame $X_t$. In contrast, the motion amount image F corresponds to the motion amount image $F_H$ that has been refined. Thus, from the motion amount image F, the detailed motion of the individual objects included in the frame $X_t$ can be tracked in addition to the overall motion between the frames $X_t$ and $X_{t+1}$.

Learning Process Performed by Estimator

A learning process for achieving the above-described estimator 10 is described below. In the following description, a neural network before functioning as the estimator 10 is referred to as a "neural network 10c".

Learning Method

Figure 7:
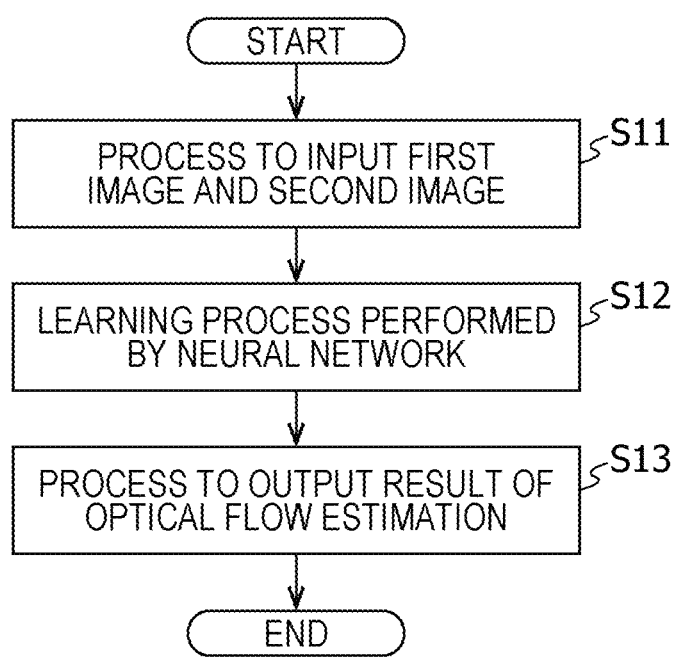
FIG. 7 is a flowchart illustrating a learning method according to the embodiment.

FIG. 7 is a flowchart illustrating a learning method according to the embodiment.

As illustrated in FIG. 7, the computer performs an input process of inputting the first image and the second image to the neural network 10c first (S11). More specifically, the computer inputs, to the neural network 10c, the first image 51 and the second image 52 that constitute a moving image and that are temporally adjacent to each other. The second image 52 is captured after a predetermined time interval has elapsed since the time of capture of the first image 51.

Subsequently, the computer causes the neural network 10c to carry out a learning process (S12). Note that after the learning process, the neural network 10c makes the neural network 10a described with reference to FIG. 2. In this case, the computer uses the first image 51 and the second image 52 input in step S11 and causes the neural network 10c to learn to output the transformation matrix H to be applied to all the pixels of the first image 51 and used to convert the first image 51 into the second image 52.

In addition, suppose that after the learning process, the neural network 10c makes the neural network 10b described with reference to FIG. 4. In this case, i) the computer causes a first neural network that constitutes the neural network 10c to use the first image 51 and the second image 52 input in step S11 and learn to output the first moving amount image 61 representing the first amount of motion of each of the pixels of the first motion amount image 51 that continues until the predetermined time interval elapses. In addition to performing the process i), ii) the computer causes a second neural network that constitutes the neural network 10c and that differs from the first neural network to use the first image 51, the second image 52, and the first moving amount image 61 input in step S11 and learn to output the second motion amount image 62 representing the second amount of motion of each of the pixels of the first motion amount image 51 that continues until the predetermined time interval elapses. At this time, the computer may cause the first neural network to use the first image 51 and the second image 52 input in step S11 and learn to output the transformation matrix H which is used for all the pixels of the first image 51 and which converts the first image 51 into the second image 52 and, thereafter, learn to output the first moving amount image 61 generated by the transformation matrix H.

Note that the computer prepares a large number of pairs each consisting of a first image and a second image that constitute a moving image and that temporally adjacent to each other. That is, by repeating steps S11 to S12, the computer can train the neural network 10c to learn by using the large number of pairs each consisting of a first image and a second image.

Subsequently, the computer performs a process to output the result of optical flow estimation (S13). At this time, suppose that after the learning process, the neural network 10c makes the neural network 10a described with reference to FIG. 2. In this case, the computer outputs, as the result of estimation of the motion between the first image 51 and the second image 52, the first moving amount image 61 which represents the amount of motion of each of the pixels of the first image 51 that continues until a predetermined time interval elapses and which is generated by the transformation matrix H output from the neural network 10c trained in step S12. This is because as described above, the first motion amount image 61 can be considered to be an optical flow representing the motion between the first image 51 and the second image. That is, the computer can cause the trained neural network 10c to output the result of optical flow estimation.

In addition, suppose that the trained neural network 10c makes the neural network 10b described with reference to FIG. 4. In this case, the computer outputs, as the result of estimation of the motion between the first image 51 and the second image 52, the second motion amount image 62 output from the neural network 10c trained in step S12. This is because as described above, the second motion amount image 62 can be considered to be an optical flow representing the motion between the first image 51 and the second image. That is, the computer can cause the trained neural network 10c to output the result of optical flow estimation.

Details of Learning Method

The process performed in step S12 illustrated in FIG. 7 is described in detail below.

Configuration of Neural Network

Figure 8:
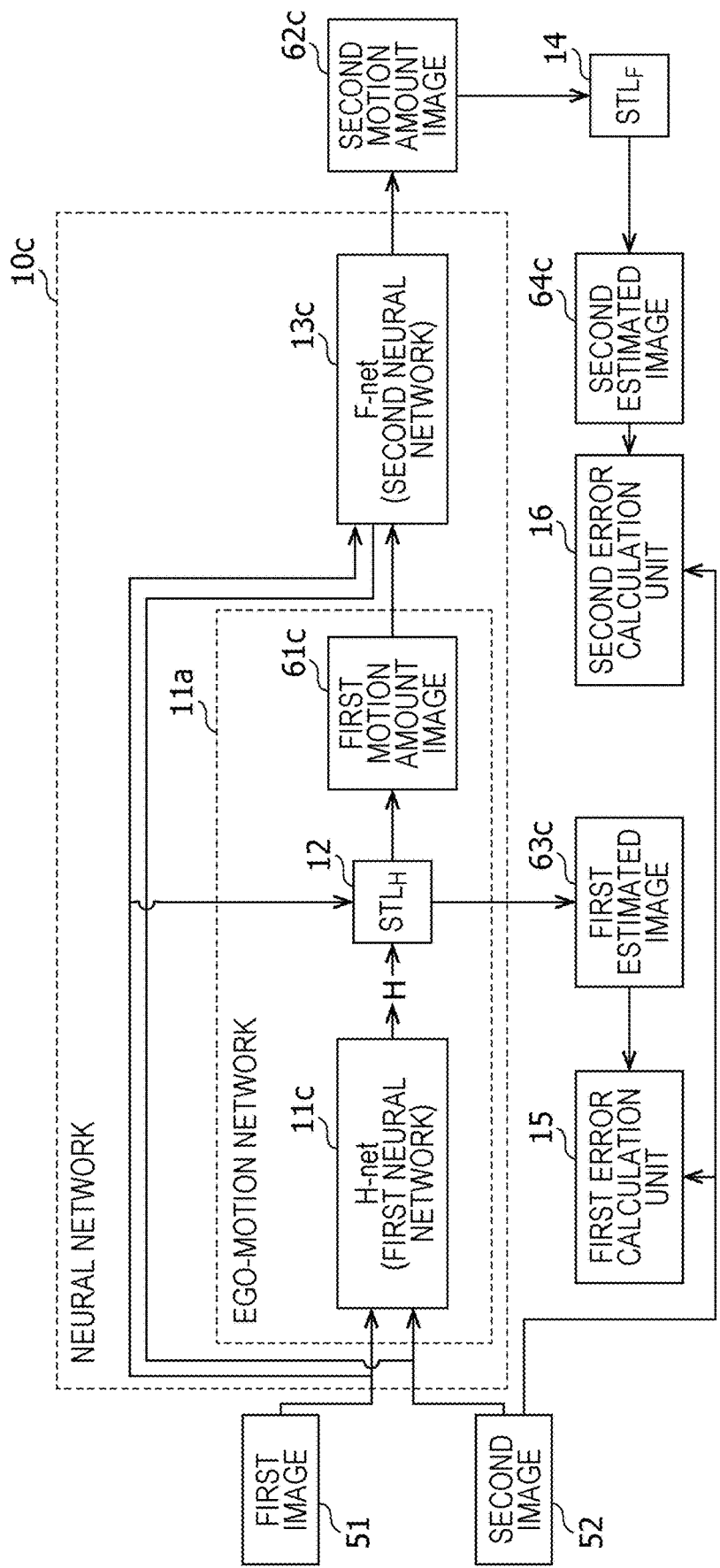
FIG. 8 is a diagram illustrating an example of the configuration of the neural network for use in the learning process according to the embodiment.

FIG. 8 is a diagram illustrating an example of the configuration of the neural network 10c used in the learning process according to the embodiment. FIG. 8 illustrates the configuration of the neural network 10c in the case where the trained neural network 10c makes the neural network 10b described with reference to FIG. 4. Note that the same reference numerals are used in FIG. 8 to describe those constituent elements that are identical to the constituent elements of FIG. 4, and detailed description of the constituent elements is not repeated.

The neural network 10c illustrated in FIG. 8 includes an H-net 11c, an $STL_H$ 12, an F-net 13c, an $STL_F$ 14, a first error calculation unit 15, and a second error calculation unit 16.

The H-net 11c is the same as the H-net 11 except that the H-net 11c has weights that it has not learned.

The $STL_H$ 12 uses the transformation matrix H output from the H-net 11c and outputs, as the result of estimation of the motion between the first image 51 and the second image 52, a first moving amount image 61c representing the first amount of motion of each of the pixels of the first image 51 that continues until a predetermined time interval elapses. That is, the first motion amount image 61c is generated by using the transformation matrix H output from the untrained H-net 11c.

In addition, the $STL_H$ 12 outputs a first estimated image 63c, which is an image obtained by converting the first image 51 by using the transformation matrix H output from the H-net 11c and which is an image to be estimated as the second image 52. That is, by receiving the first image 51, the $STL_H$ 12 further generates the first estimated image 63c to be estimated as the second image 52 by using the transformation matrix H output from the H-net 11c. Thereafter, the $STL_H$ 12 outputs the first estimated image 63c.

The F-net 13c is similar to the F-net 13 except that F-net 13c has weights that it has not learned. That is, the F-net 13c generates a second motion amount image 62c by using the first motion amount image 61c and outputs the second motion amount image 62c.

Like the $STL_H$ 12, the $STL_F$ 14 is a spatial transformer layer constituted by an STN. The $STL_F$ 14 generates a second estimated image 64c, which is an image to be estimated as the second image 52, by using the second motion amount image 62c output from the F-net 13c and outputs the second estimated image 64c.

The first error calculating unit 15 calculates a first error which is an error between the first estimated image 63c and the second image 52.

The second error calculating unit 16 calculates a second error which is an error between the second estimated image 64c and the second image 52.

Details of Process Performed in Step S12

Figure 9:
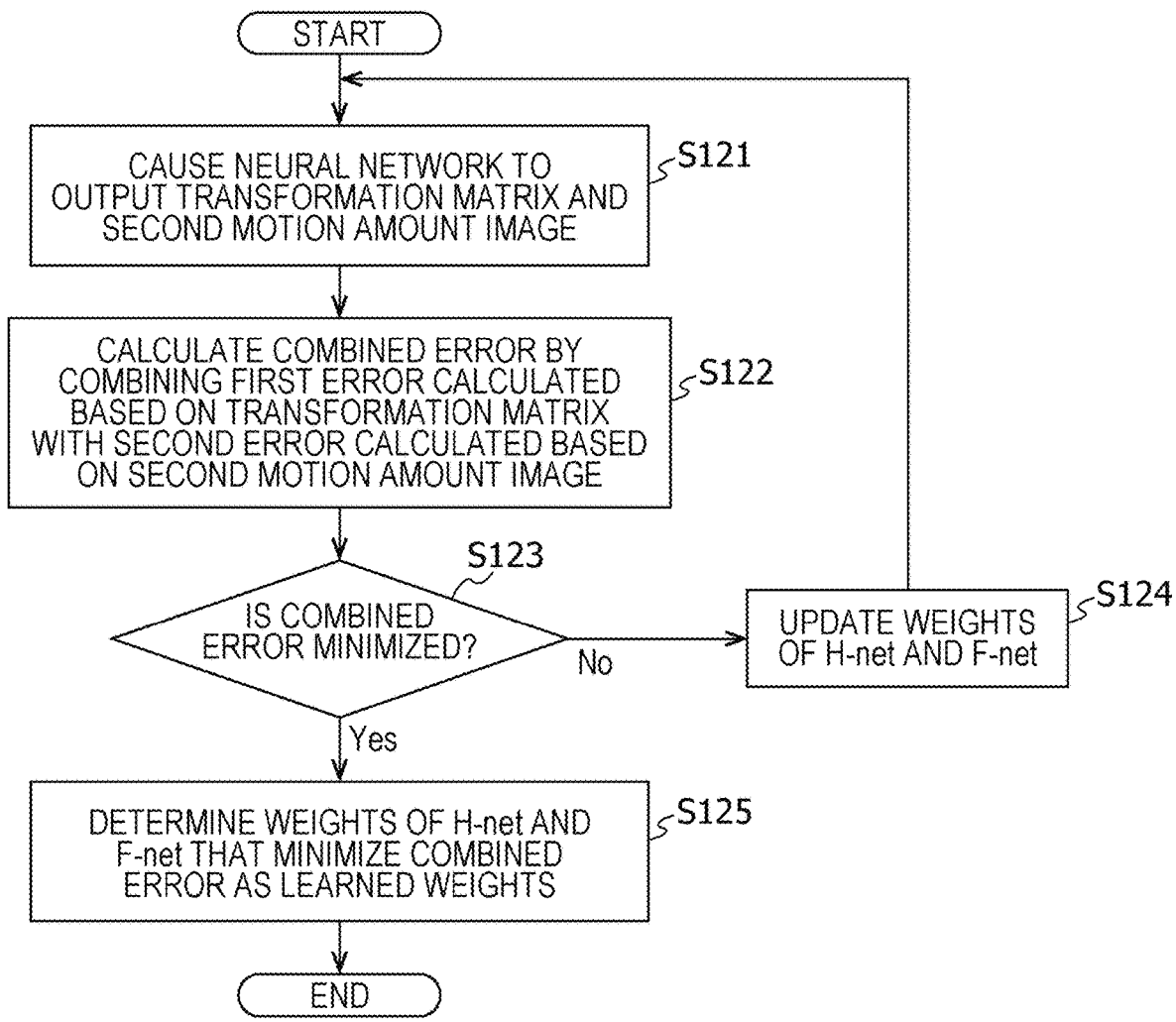
FIG. 9 is a flowchart illustrating an example of the details of the process performed in step S12 illustrated in FIG. 7.

FIG. 9 is a flowchart illustrating an example of the details of the process performed in step S12 illustrated in FIG. 7. In FIG. 9, as an example, the learning process in step S12 is performed by using the neural network 10c illustrated in FIG. 8.

In step S12, the computer causes the neural network 10c to output the transformation matrix H and the second motion amount image 62c first (S121). More specifically, the computer causes the H-net 11c to output the transformation matrix H that is applied to all the pixels of the first image 51 and that is used to convert the first image 51 into the second image 52. At the same time, the computer causes the F-net 13c to use the first motion amount image 61c representing the first amount of motion generated from the first image 51, the second image 52, and the transformation matrix H and output the second motion amount image 62c representing the second amount of motion of each of the pixels of the first image 51 that continues until a predetermined time interval elapses.

Subsequently, the computer combines a first error calculated on the basis of the transformation matrix H output in step S121 and a second error calculated on the basis of the second motion amount image 62c output in step S121 and calculates a combined error (S122). More specifically, the computer calculates a first error which is an error between the first estimated image 63c and the second image 52. Note that the first estimated image 63c is an image to be obtained after a predetermined time interval elapses since the capture of the first image 51 and which is generated by the first image 51 and the transformation matrix H output in step S121. In addition, the computer calculates a second error which is an error between the second estimated image 64c and the second image 52. Note that the second estimated image 64c is an image to be obtained after the predetermined time interval elapses since the capture of the first image 51 and which is generated by the first image 51 and the second motion amount image 62c output in step S121. Subsequently, the computer calculates the combined error by combining the first error and the second error.

Note that the first error, the second error, and the combined error are calculated using Charbonnier loss, for example.

Subsequently, the computer determines whether the combined error calculated in step S122 is the minimum (S123).

If, in step S123, the combined error is not the minimum value (No in S123), the weights of the H-net 11c and the F-net 13c are updated so that the difference is reduced (S124). Thereafter, the computer performs a regression process to repeat the process starting from step S121.

However, if, in step S123, the combined error is the minimum value (Yes in S123), the weights of H-net 11c and F-net 13c obtained when the combined error becomes minimum are determined as learned weights (S124). More specifically, if the combined error calculated in S122 is the minimum value, the weights of the H-net 11c and the F-net 13c, which minimize the combined error, are determined as the weights of the trained Ego-motive network 11a and F-net 13. Note that if the upper limit of the number of the regression processes is determined, the term "minimum combined error" may mean the minimum combined error obtained when the upper limit is reached.

Figure 10:
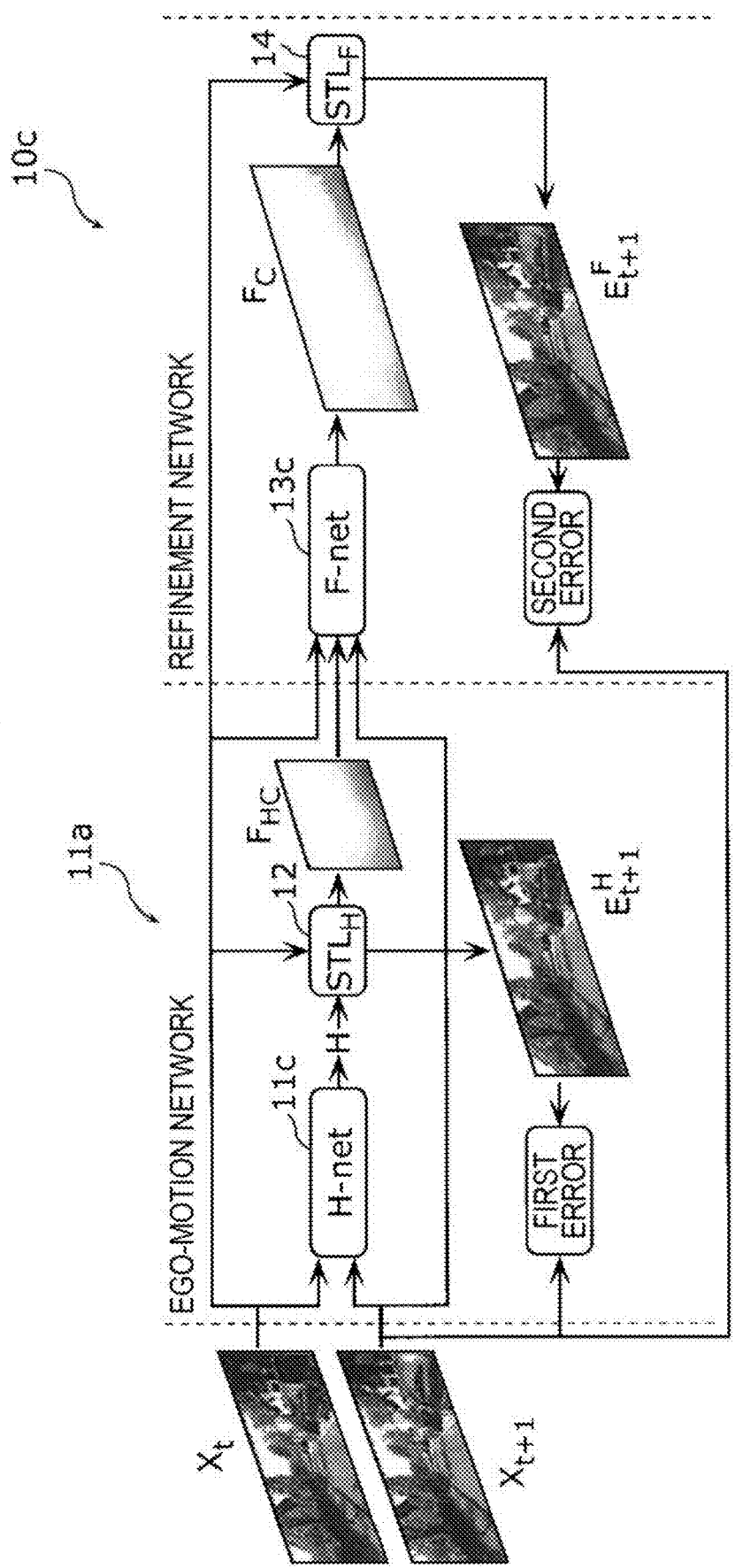
FIG. 10 is a schematic illustration of the details of the process performed in step S12 illustrated in FIG. 7.

FIG. 10 is a schematic illustration of the details of the process performed in step S12 illustrated in FIG. 7. FIG. 10 also illustrates an example of the case in which a learning process is performed by using the neural network 10c illustrated in FIG. 8.

As illustrated in FIG. 10, suppose that frames $X_t$ and $X_{t+1}$, which are temporally consecutive images captured by the in-vehicle camera, are input to the neural network 10c as the first image 51 and the second image 52, respectively. In this case, the computer causes the ego-motion Network 11a that constitutes the neural network 10c to output, as the first moving amount image 61c, a motion amount image $F_{HC}$ to the F-net 13c. The motion amount image $F_{HC}$ represents the amount of motion of each of the pixels of the frame $X_t$ that continues until a predetermined time interval elapses. In FIG. 10, the motion amount image $F_{HC}$ indicates the motion between the frames $X_t$ and $X_{t+1}$ with the darkness of color.

In addition, the computer causes the Ego-motion network 11a to output a first estimated image $E^H_{t+1}$ that is an image obtained by converting the frame $X_t$ by using the transformation matrix H output from the H-net 11c and that is an image estimated as the second image 52.

In addition, the computer inputs the motion amount image $F_{HC}$ output from the Ego-motion network 11a and the frames $X_t$ and $X_{t+1}$ to the F-net 13c. Thereafter, the computer causes the F-net 13c to output, as the result of estimation of the motion between the frames $X_t$ and $X_{t+1}$, the motion amount image Fc representing the amount of motion of each of the pixels of the frame $X_t$ that continues until the predetermined time interval elapses.

In addition, the computer causes the STL$^F$ 14 to generate a second estimated image $E^F_{t+1}$ by using the motion amount image Fc output from the F-net 13c and output the second estimated image $E^F_{t+1}$ which is an image to be estimated as the second image 52.

In addition, the computer causes the first error calculation unit 15 to calculate the first error which is an error between the first estimated image $E^H_{t+1}$ and the second image 52 and causes the second error calculating unit 16 to calculate the second error which is an error between the second estimated image $E^F_{t+1}$ and the second image 52. Thereafter, the computer trains the neural network 10c to learn the weights so as to minimize the combined error obtained by combining the first error and the second error.

To evaluate the first error and the second error, the Charbonnier loss function for error given by, for example, the following equation can be used:

$$L_{ch} = \sqrt{(E_{t+1} - X_{t+1})^2 + \varepsilon} \quad (1).$$

Furthermore, the combined error can be evaluated by weighting the first error and the second error as expressed by, for example, the following equation:

$$L_{ch} = L_{ch}(E_{t+1}^H, X_{t+1}) \times \alpha + L_{ch}(E_{t+1}^F, X_{t+1}) \times \beta \quad (2).$$

Note that the error functions given by Equation (1) and Equation (2) are only an example. In Equation (1), 6 is a regularization constant (for example, 0.1), which is a term added to avoid excessive learning and the like. α and β are used for weighting.

As can be seen from FIG. 10, to cause the neural network 10c to estimate the optical flow, the frame $X_{t+1}$ of the frames $X_t$ and $X_{t+1}$ input for carrying out the learning according to the present disclosure can be used as the teacher data. That is, according to the learning method of the present disclosure, it is not necessary to use teacher data except for the frame $X_{t+1}$ input together with the frame $X_t$ for learning. Thus, the need for separately preparing correct answer data can be eliminated.

Effect and Others

Estimation of an optical flow by using a neural network is one of the most active research fields. However, it is difficult to estimate the tightly related motion flow between two temporally adjacent images that constitute a moving image captured by an in-vehicle camera and, thus, it has been difficult to cause a neural network to estimate an optical flow accurately in a short time.

According to analysis, this mainly results from two factors. The first factor is that in order to estimate an optical flow, it is necessary to take into account the influence other than the influence of the motion of a car (also referred to as "Ego-motion"). For example, the image of a scene captured in a city is composed mainly of stationary objects, such as buildings, and the motion pattern in the plane of the image of a scene strongly correlates with the motion of the in-vehicle camera. However, the image of a scene is not composed of only stationary objects. Objects around a stationary object, such as other cars and pedestrians, move independently of the motion of the in-vehicle camera. Accordingly, in order to obtain a reliable result of optical flow estimation, it is necessary to correctly estimate the two types of motion, that is, the Ego-motion and the motion of a surrounding object.

The second factor is that in order to estimate the optical flow, it is necessary to collect, as correct answer information, data including correct pixel-level optical flow information. As described above, it is difficult to collect data including such correct answer information. This is because the publicly available automotive data sets lack optical flow information functioning as correct answer information.

In order to eliminate the first factor, according to the learning method of the present embodiment, of the two types of motion (Ego-motion and the motion of a surrounding object), Ego-motion is estimated by the H-net, which is the first neural network, and the motion of a surrounding object is estimated by the F-net, which is the second neural network. That is, the H-net understands that the previous one of temporally consecutive two images is converted into the temporally subsequent image by using pixel-level projective geometric transformation and learns to output the elements of the transformation matrix used for the projective geometric transformation. Thereafter, the transformation matrix output from the H-net is transformed into the first moving amount image by the STL described above. In this manner, the optical flow indicating the Ego-motion can be estimated. Note that since the motion of a surrounding object cannot be reflected in the transformation matrix due to the spatial restriction of the projective geometric transformation, the first motion amount image represents the result of estimation of the overall motion between two consecutive images, as described above. Thus, the first moving amount image does not represent the result of estimation of the detailed motion of individual objects in the images. That is, the first motion amount image corresponds to rough estimation of the optical flow between the two consecutive images.

Subsequently, by using the first moving amount image as the teacher data, the F-net learns, from the two consecutive images, to output a second motion amount image, which is an image obtained by further incorporating the motion of the surrounding objects into the first motion amount image. That is, the second motion amount image corresponds to a refined first motion amount image.

In this manner, according to the learning method of the present embodiment, estimation of the optical flow between two consecutive images can be learned.

In order to eliminate the second factor, according to the learning method of the present embodiment, of two temporally adjacent images input for learning, the temporally subsequent image is used as the teacher data and, thus, self-learning is carried out. That is, according to the learning method of the present embodiment, prepared teacher data are not required for learning of estimation of an optical flow.

More specifically, by training the H-net 11 serving as the first neural network to learn to output the transformation matrix for transforming the first image 51 into the second image 52, the second image, which is input together with the first image, can function as teacher data. In addition, the F-net 13, which is the second neural network, can be trained by using, as teacher data, the first moving amount image 61 generated from the transformation matrix output by the H-net 11. That is, according to the learning method of the present embodiment using a neural network that constitutes only the above-mentioned H-net 11 or a neural network that constitutes the H-net 11 and the F-net 13, self-learning can be carried out by using only two temporally adjacent images input for learning.

In this manner, according to the learning method of the present embodiment, a neural network that constitutes only the H-net 11 or a neural network that constitutes the H-net 11 and the F-net 13 can be trained to learn estimation of an optical flow without using teacher data.

EXAMPLES

Since the effectiveness of the neural network used in the estimator 10 according to the present disclosure has been verified, the experiment results are described below as an example.

As described above, the neural network for use in the estimator 10 can self-learn by using, as teacher data, the temporally subsequent image of the two temporally adjacent images input for learning. That is, the neural network does not require teacher data which is correct answer data prepared for estimation of an optical flow. Thus, when training the neural network for use in the estimator 10, a large-scale automobile data set, such as Kitti raw or DR (eye) VE, can be used. Note that the Kitti raw Data set contains 44,000 images acquired in Karlsruhe City, and the DR (eye) VE Data base contains 555,000 images acquired in expressway, in downtown areas, or in countryside. In addition, the images of the DR (eye) VE Data base include images representing sudden changes in an image state caused by transitions between the sun and rain and between day and night or large scene variations.

In contrast, Kitti Flow is known as the largest scale dataset of actual automotive data including correct answer information. However, Kitti Flow contains only less than 800 pairs of images with correct answer information for two versions, that is, a training version and a test version. Note that in recent years, Virtual Kitti has been released as a synthesized automobile data set influenced by Kitti. However, even the Virtual Kitti Data set contains only over 21,000 frames with complete correct answer information for an optical flow, semantic segmentation, a depth and object bounding box, and an object bounding box.

The performance of the neural network for use in the estimator 10 has been evaluated by using Kitti raw Data set, Virtual Kitti Data set, or DR (eye) VE Data base. Thus, the result of evaluation is described below. Note that in the experiment described below, each of the datasets (Kitti raw Data set, Virtual Kitti Data set, or DR (eye) VE Data base) was used without refining.

Experimental Conditions

In the experiment, learning was carried out by using Adam optimizer with a learning rate of $10^{-4}$, a mini batch size of 16, 131 of 0.5, and the other parameters of default values (the initial values). In addition, it was determined that the learning ended after 250 epoch each consisting of 1000 mini batches. In order to evaluate the first error and the second error in the H-net and F-net, the combined error was given by Equation (2) described above, and a was set to 0.5, and β was set to 1.

Experimental Result

Figures 11, 12, 13:
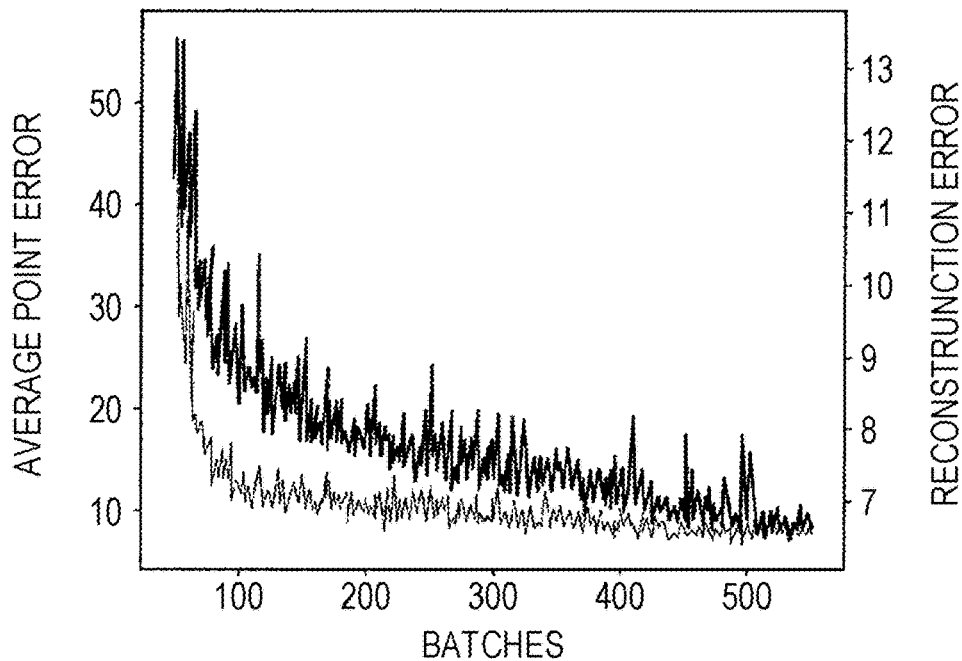
FIG. 11 is a diagram illustrating the learning effect of the learning method according to the present disclosure.
FIG. 12 is a diagram illustrating the evaluation results of the neural network trained by using Kitti raw Data set according to the present disclosure.
FIG. 13 is another diagram illustrating the evaluation when the learning method according to the present disclosure is carried out by using the Virtual Kitti Data set.

FIG. 11 is a diagram illustrating the learning effect of the learning method according to the present disclosure. In FIG. 11, to increase the readability of the plot scale, the data for the first 50 mini-batches are not given. In addition, in FIG. 11, the data indicated as a thin line are the data of a comparative example, which represents the relationship between the number of batches and the Average Point Error when learning is carried out by using the correct answer data of Virtual Kitti Data set as teacher data. In addition, the data indicated as the bold line represents the relationship between the number of batches and the Reconstruction Error when the neural network according to the present disclosure is trained by using the Virtual Kitti Data set without teacher data. Reconstruction Error corresponds to the value of the combined error given by Equation (2).

As can be seen in FIG. 11, the neural network according to the present disclosure exhibits different learning effects if the number of batches is small, as compared with the comparative example. However, if the number of batches is about 500 or greater, the learning effects are the same. That is, even when the neural network 10c for use in the estimator 10 according to the present disclosure is trained without the teacher data, effective learning can be carried out if a sufficient number of batches, that is, a sufficient number of datasets are provided.

FIG. 12 illustrates the evaluation results of the neural network trained by using the Kitti raw Data set according to the present disclosure. In FIG. 12, the evaluation results are illustrated when the H-net and F-net are independently trained so as to minimize Equation (1), for example. In addition, in FIG. 12, the evaluation results are illustrated as "joint" when the neural network 10c according to the present disclosure having the trained H-net and F-net is trained so as to minimize Equation (2), for example. Furthermore, in FIG. 12, Accuracy@5 means the ratio of motion vectors with an End Point Error less than 5 pixels. The performance increases with increasing value of Accuracy@5. APE means the Average Point Error in all the motion vectors. The performance increases with decreasing value of APE. Note that Time (s) means the execution time calculated by using NVIDIA GTX 1080 Ti GPU.

As can be seen from FIG. 11, the execution time of the F-net is about 4 times longer than that of the H-net, and Accuracy@5 and APE indicating the accuracy are also bad. Since as described above, the F-net has the configuration of an auto encoder, a dataset containing a large amount of correct answer information is required for achieving a high performance with independent learning.

In contrast, since the above-described transformation matrix H is used for warping (transformation, such as deformation) of an image, the H-net that learns to output the transformation matrix exhibits high performance even without the teacher data. The H-net can output the transformation matrix with execution time of 12 ms.

Note that in "joint" corresponding to the neural network 10c according to the present disclosure, the execution time is four times or more longer than that of the H-net. In addition, the execution time is slower than that of even the F-net. However, Accuracy@5 is higher than that of the F-net and H-net. APE is lower than that of the H-net, but is higher than that of the F-net.

As can be seen from above description, the neural network 10a according to the present disclosure that constitutes the H-net described in the present embodiment and the neural network 10b that constitutes the F-net and H-net according to the present disclosure are useful.

FIG. 13 is another diagram illustrating the evaluation when the learning method according to the present disclosure is carried out by using the Virtual Kitti Data set. As comparative examples, FIG. 13 also illustrates the evaluation of the models DeepFlow, EpicFlow, FlowNetv2, and MR Flow trained by using the teacher data according to other methods.

Although the Virtual Kitti Data set is based on a typical car viewpoint, it differs from other data sets. For example, Virtual Kitti Data set has typical artifacts in computer rendered scenes. However, at the present time, the Virtual Kitti Data set is the largest data set that provides high density correct answer optical flow information for automobiles obtained by warping (deforming) the scenes with computer graphics. In addition, unlike the other datasets with LIDAR-based correct answer information, the Virtual Kitti Data set has guaranteed accuracy.

As can be seen from FIG. 13, Ours (or Ours+FT), that is, the learning method according to the present disclosure has an execution time shorter than other models trained by using teacher data, and Accuracy@5 and APE which represent the accuracy are equal to or higher than those of the other models. More specifically, the learning method according to the present disclosure is 2.5 times faster than the fastest one of the other models, while obtaining the best APE result as compared with the other models.

FIG. 14 is a diagram illustrating the evaluation of the influence of environmental conditions on the learning method according to the present disclosure using DR (eye) VE Data base. In addition, as comparative examples, FIG. 14 illustrates evaluation of models DeepFlow and EpicFlow trained by using teacher data according to another method. Since the DR (eye) VE Data base does not provide correct answer information, the PSNR (Peak Signal to Noise Ratio) of the estimated image used to estimate the optical flow was measured, and the PSNR is used as the evaluation index for the influence of the environmental condition.

As illustrated in FIG. 14, Ours, that is, the learning method according to the present disclosure has higher PSNR than the other models trained by using teacher data in any of the nighttime environment, the rainy environment, and the daytime environment. For example, as can be seen from FIG. 14, according to the learning method of the present disclosure, the PSNR is high even in the nighttime environment, as compared with the other models. That is, the intensity of the estimated image used to estimate the optical flow and output by the estimator 10 that has learned by using the learning method according to the present disclosure is low, and the estimated image has an effectively low error. Furthermore, as can be seen from the experiment illustrated in FIG. 14, the environmental condition does not have a significant impact on estimation of an optical flow performed by the estimator 10 that has learned by using the learning method according to the present disclosure.

As described above, according to the learning method and the program thereof according to the present disclosure, a neural network can be trained to learn estimation of the optical flow without the teacher data. The estimator that has learned by using the learning method according to the present disclosure can estimate the optical flow in a very short time or near real time and can perform the estimation with high accuracy. As a result, the learning method and program according to the present disclosure can be sufficiently applied to systems that are required to detect or track a plurality of objects on the road in real time and with high accurately (e.g., ADAS or self-driving car systems).

Possibility of Other Embodiments

While the learning method according to the present disclosure has been described with reference to the embodiments above, the subject of the processes and the apparatuses that perform the processes are not limited to any particular ones. The processes may be performed by a processor incorporated into a specific apparatus installed locally (described in more detail below). Alternatively, the processes may be performed by a cloud server or the like disposed at a location different from the locations of the local apparatuses.

It should be noted that the present disclosure is not limited to the above embodiments. For example, another embodiment achieved by combining the components described in the specification in any way and another embodiment achieved by removing some of the components may be encompassed within the embodiments of the present disclosure. In addition, modifications obtained by applying a variety of changes that a person skilled in the art conceives to the above-described embodiments without departing from the spirit and scope of the present disclosure (that is, within the meanings of words in the claims) are encompassed within the scope of the present disclosure.

Furthermore, the present disclosure further includes the cases described below.

(1) More specifically, the above-described apparatus is a computer system including a microprocessor, a ROM, a RAM, a hard disk unit, a display unit, a keyboard, a mouse, and the like. A computer program is stored in the RAM or the hard disk unit. The microprocessor operates in accordance with the computer program and, thus, each of apparatuses achieves its function. Note that the computer program is composed of a plurality of instruction codes for instructing the computer to achieve predetermined functions.

(2) Some or all of the constituent elements that constitute the above-described apparatus may be formed from a single system LSI (Large Scale Integration). A system LSI is a super multifunctional LSI produced by integrating a plurality of constituent units into one chip. More specifically, the system LSI is a computer system including a microprocessor, a ROM, and a RAM. The RAM has a computer program stored therein. The microprocessor operates in accordance with the computer program and, thus, the system LSI achieves its function.

(3) Some or all of the constituent elements that constitute the above-described apparatus may be formed from an IC card or a single module removable from the device. The IC card or the module is a computer system formed from, for example, a microprocessor, a ROM, and a RAM. The IC card or the module may include the above-described super multifunctional LSI. When the microprocessor operates in accordance with the computer program, the IC card or the module provides its function. The IC card or the module may be tamper resistant.

(4) In addition, the present disclosure may be the above-described method. Furthermore, the present disclosure may be a computer program that provides these methods by using a computer, or the present disclosure may be a digital signal composed of the computer program.

(5) In addition, the present disclosure may be the above-described computer program or the digital signal recorded in a computer-readable storage medium, such as a flexible disk, a hard disk, a CD-ROM, an MO, a DVD, a DVD-ROM, a DVD-RAM, a BD (Blu-ray (registered trademark) Disc), or a semiconductor memory. Furthermore, the present disclosure may be the above-described digital signal recorded in such a storage medium.

Furthermore, the present disclosure may be the computer program or the digital signal transmitted via an electric communication network, a wireless or wired communication network, a network represented by the Internet, data broadcasting, or the like.

Still furthermore, the present disclosure may be a computer system including a microprocessor and a memory. The memory may store the computer program therein, and the microprocessor may operate in accordance with the computer program.

Still furthermore, the present disclosure may be realized by another independent computer system by recording the program or the digital signal in the storage medium and transferring the storage medium or transferring the program or the digital signal via, for example, the above-mentioned network.

The present disclosure can be used for a learning method and a program using a neural network and, in particular, for a system, such as ADAS and a self-driving car system, required to detect or track a plurality of objects on the road in real time with high accuracy.

What is claimed is:

1. A learning method comprising:
inputting, to a neural network, a first image and a second image that constitute a moving image and that are temporally adjacent to each other, the second image being an image subsequent to the first image with a predetermined time interval therebetween;
i) causing a first neural network that constitutes the neural network to use the first image and the second image and learn to output a first motion amount image representing a first amount of motion of each of pixels of the first image that continues until the predetermined time interval elapses and ii) causing a second neural network that constitutes the neural network and that differs from the first neural network to use the first image, the second image, and the first motion amount image and learn to output a second motion amount image representing a second amount of motion of each of the pixels of the first image that continues until the predetermined time interval elapses; and
outputting the second motion amount image as a result of estimation of motion between the first image and the second image, wherein
causing the first and second neural networks to learn to output the motion amount images involves causing the first neural network to use the first image and the second image and learn to output a transformation matrix applied to all the pixels of the first image and used to convert the first image into the second image, and causing the first neural network to learn to output the first motion amount image generated from the transformation matrix,
the transformation matrix carries out global transformation tracking the overall motion between the first and second images, but does not track the detailed motions of individual objects in the images,
the first motion amount image generated using the transformation matrix represents the result of estimation of the overall motion between the first image and the second image, but does not represent estimation of the detailed motions of individual objects in the images, and
the second motion amount image represents estimation of the detailed motions of individual objects in the images, wherein the method further comprises
a) generating a first estimated image from only the transformation matrix and the first image, the first estimated image being an image subsequent to the first image with the predetermined time interval therebetween,
b) calculating a first error between the first estimated image and the second image,
c) generating the second motion amount image from the transformation matrix and the first and second images,
d) generating a second estimated image from the second motion amount image and the first image, the second estimated image being an image subsequent to the first image with the predetermined time interval therebetween,
e) calculating a second error between the second estimated image and the second image,
f) combining the first and second errors, and
g) determining weights of the first neural network and the second neural network that minimize the combined error.

2. The learning method according to claim 1, a first neural network that constitutes the neural network includes at least one convolutional layer and at least one fully connected layer, and
wherein the fully connected layer outputs at least eight of nine parameters functioning as nine coefficients that constitute the transformation matrix.

3. The learning method according to claim 1, a first neural network that constitutes the neural network includes at least two convolutional layers, and
wherein the final layer of the at least two convolutional layers outputs at least eight of nine parameters functioning as nine coefficients that constitute the transformation matrix.

4. The learning method according to claim 1, wherein the second neural network that constitutes the neural network includes a compression layer consisting of at least one convolutional layer, an expansion layer located subsequent to the compression layer and consisting of at least one deconvolutional layer, and a single convolutional layer located subsequent to the expansion layer, and
wherein the single convolutional layer outputs two parameters indicative of the amount of motion of each of the pixels constituting the second motion amount image.

5. A non-transitory computer-readable recording medium storing a program which causes a computer to:
input, to a neural network, a first image and a second image that constitute a moving image and that are temporally adjacent to each other, the second image being an image subsequent to the first image with a predetermined time interval therebetween;
i) cause a first neural network that constitutes the neural network to use the first image and the second image and learn to output a first motion amount image representing a first amount of motion of each of pixels of the first image that continues until the predetermined time interval elapses and ii) cause a second neural network that constitutes the neural network and that differs from the first neural network to use the first image, the second image, and the first motion amount image and learn to output a second motion amount image representing a second amount of motion of each of the pixels of the first image that continues until the predetermined time interval elapses; and
output the second motion amount image as a result of estimation of motion between the first image and the second image, wherein
causing the first and second neural networks to learn to output the motion amount images involves causing the first neural network to use the first image and the second image and learn to output a transformation matrix applied to all the pixels of the first image and used to convert the first image into the second image and causing the first neural network to learn to output the first motion amount image generated from the transformation matrix,
the transformation matrix carries out global transformation tracking the overall motion between the first and second images, but does not track the detailed motions of individual objects in the images,
the first motion amount image generated using the transformation matrix represents the result of estimation of the overall motion between the first image and the second image, but does not represent estimation of the detailed motions of individual objects in the images, and the second motion amount image represents estimation of the detailed motions of individual objects in the images, wherein the program also causes the computer to
a) generate a first estimated image from only the transformation matrix and the first image, the first estimated image being an image subsequent to the first image with the predetermined time interval therebetween,
b) calculate a first error between the first estimated image and the second image,
c) generate the second motion amount image from the transformation matrix and the first and second images,
d) generate a second estimated image from the second motion amount image and the first image, the second estimated image being an image subsequent to the first image with the predetermined time interval therebetween,
e) calculate a second error between the second estimated image and the second image,
f) combine the first and second errors, and
g) determine weights of the first neural network and the second neural network that minimize the combined error.

* * * * *